Aug. 25, 1942.   J. W. BATCHELDER   2,293,882
DRIVE CONNECTION
Filed Feb. 8, 1940

INVENTOR:
James W. Batchelder,
BY Cushman Darby & Cushman
ATTORNEYS

Patented Aug. 25, 1942

2,293,882

UNITED STATES PATENT OFFICE 2,293,882

DRIVE CONNECTION

James William Batchelder, Titusville, Pa.

Application February 8, 1940, Serial No. 317,941

4 Claims. (Cl. 287—52.08)

The instant invention relates to drive connections.

An object of the invention is the provision of dependable, effective, and economical means and arrangement for securing together two elements in driving relation by means of a set-screw in such manner that the set-screw will be prevented from working loose.

Another important object of this invention is the provision of self-locking characteristics in a set-screw without the use of non-standard forms of screw threads, it being possible to form the screw of the present invention with either standard American National Fine or American National Coarse screw threads, as well as Briggs, Whitworth, and other standard forms and leads or pitches.

A further object of this invention is the provision of a self-locking set-screw of such design that standard tools such as screw drivers, wrenches, and the like, may be used to operate the screw. In this connection, it may be stated that the head of the screw included in the present invention may be provided with conventional types of tool engaging means or heads, such as slots; splined, hexagonal or other shaped recesses; hexagonal or square heads and the like.

A still further object of the instant invention is to provide a set-screw which can be used many times without impairment of its self-locking characteristics. In the past, set-screws have been used with fibre or metallic lock washers or have been provided with bendable elements adapted to hold the screw in place. Such bendable elements could only be used once and, in any event, were unreliable in their action. The present construction entirely avoids the necessity for such comparatively fragile means for holding a screw.

Another object of the present invention is to provide a locking screw of such design that it is adapted for economical production in modern, high speed, automatic machinery. In this connection, the set-screw is of a one piece construction which greatly facilitates construction and use in reducing to a minimum the steps of manufacture, and ease of assembly. With the present construction, therefore, no special skill is required in its application and a ready determination of its locking characteristic is had upon visual inspection.

Another important object of the invention is the provision of a set-screw which is adapted to transmit torque as well as lock together two or more elements. In the past, where even a light torque was to be transmitted between two elements, it was necessary to provide a key. With the present invention, by virtue of the increased holding power provided, no key is necessary, since the set-screw will withstand at least light torque loads.

The set-screw included in the present invention comprises a threaded body portion and a non-threaded extended portion, one of these portions being tapered. Any such form of set-screw is particularly adapted to lock securely together two elements when the outer element is provided with a threaded aperture to receive the threaded body portion of the set-screw, with the other portion of the set-screw extending into a recess in the inner element.

According to the present invention, the recess of the inner element would be cylindrical and of slightly greater depth than the length of the extending end of the screw, and of a diameter substantially corresponding to the diameter of the tap drill used to form the aperture of the outer element, or at least to form the extreme inner portion of such aperture. That is, the recess will be smaller than the smallest diameter of the aperture, but slightly larger than the diameter of the set-screw extension, and the recess will also be deeper than the length of set-screw extension.

The instant invention may be readily incorporated in an ordinary hub and shaft combination and is adaptable for installation on machinery already built, it being merely necessary to provide a recess in the shaft, sleeve, or the like upon which a hub, for example, is to be mounted, the recess receiving the extended threadless portion of my improved set-screw.

Tapered point set-screws have heretofore been provided, but all such previous set-screws included means to engage endwise against a shaft or to pass entirely through the shaft. Such known types have a tendency to become loose if not provided with separate locking means or materially weaken the shaft.

Previous inventions have suggested the use of a tapered pin extending entirely through the shaft, having the smaller end threaded to cooperate with a nut for drawing it into tight engagement. The present improvement avoids the necessity of piercing the shaft and thus a stronger construction results. Further, removal of the nut of such prior devices did not force the pin out of locked relationship. Unscrewing the set-screw of the present invention positively causes it to be released.

It is to be noted that the present form of locking screw cooperates with the shaft in a manner to preclude a marring thereof which permits the hub or other outer element to be easily removed from the shaft or other inner element as compared to a form of set-screw which mars the surface of the shaft making axial movement of the hub on the shaft difficult. To avoid this drawback, it has been the practice in the past to undercut the shaft to receive the end of the set-screw but no cooperation has been established between the undercut and the set-screw otherwise than to permit endwise engagement of the set-screw with the shaft. The present invention provides a permanent locking means which does not interfere in the least with a ready separation of the hub and shaft elements.

Summarizing the prior practice, it is pointed out that it has involved the use of arrangements which were disadvantageous in that they were non-locking, or could be used but once, or either badly marred or weakened the shaft or other inner element. The present invention eliminates all of these difficulties, and at a cost substantially below the cost of every prior device except those which were most obviously inefficient.

Other objects and advantages of the invention will be apparent from the specification and drawings, wherein.

Figure 1:
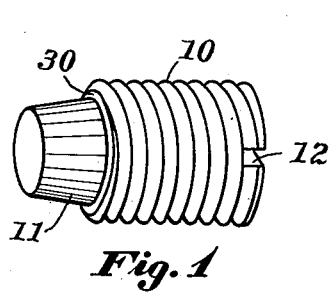
Figure 1 is a perspective view of the improved set-screw or lock screw.

In the form of the invention shown in Figure 1, the set-screw or lock screw is provided with a cylindrical threaded body portion 10 and a tapered inner end portion or extension 11. The opposite end of the body may be slotted as at 12 or otherwise formed to receive a screw driver, wrench, or other driving tool. The taper on the inner end portion is relatively steep, and the largest diameter of the tapered end is preferably smaller than the root diameter of the threads.

Figure 2:
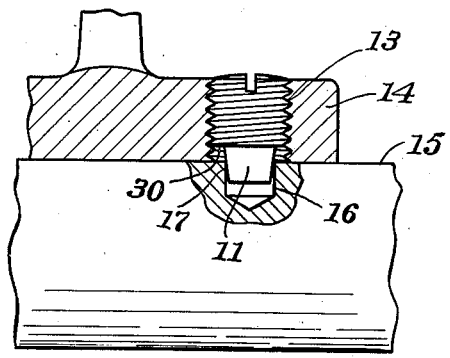
Figure 2 shows an application of the lock screw shown in Figure 1.

A locking screw so constructed is adapted to be driven into a cylindrical threaded aperture 13 in a hub 14, as shown in Figure 2, the hub being positioned on a shaft 15 which is provided with a cylindrical recess 16 cooperating with the threaded aperture 13. When the locking screw is in position in the aperture, its tapered inner end portion 11 fits partially within the recess 16. The locking screw is driven in by means of the cooperating threads until the tapered inner end 11 has frictional engagement at 17 with the wall of the recess 16, at substantially its uppermost edge, with such force that accidental displacement of the locking screw is prevented. It is necessary in order to obtain such locking action that the recess extend into the shaft such a distance that the end of the screw cannot engage the bottom. The tight engagement at 17 of the tapered end within and at the upper edge portion of the cylindrical recess, is also effective accurately to align the hub with respect to the shaft, the recess acting as a centering point. The tapered end extending into the recess transmits torque between the shaft and the hub and, in instances where a light load is carried, the end of the locking screw alone may serve as the key between the hub and the shaft.

The locking screw so far described has an extending end portion that is somewhat smaller than the body portion and a shoulder 30 is thus formed. In using this locking screw, therefore, it is essential that the frictional locking action take place before the shoulder reaches the bottom of the threaded aperture. That is, the proportion of the parts must be such that the tapered friction binding action must be accomplished before the shoulder abuts any portion of the shaft or hub which would prevent the screw driving in far enough to obtain the required frictional engagement.

The use of the set-screw described will be understood upon reference to Figures 1 and 2. The screw is adapted to be driven through a threaded aperture in the hub such that the extending end portion fits within the recess provided in the shaft. The locking screw, therefore, serves the dual function, as above explained, of transmitting torque and locating the hub axially of the shaft, using the recess as a centering point.

It is essential to the invention that the slope of the tapered element which is driven into frictional engagement, be relatively steep in order that there will be as much frictional area in contact as possible. Variations in the degree of slope may be provided for different types of work, and in very close machine work, the slope will be steepest. In the rougher grades of work, it is suggested that a slope cannot be as great. However, sufficient friction may be easily attained to effect a permanent application of the set-screw whereby a more reliable locking of two relatively movable parts is obtained.

Various modifications of the invention will appear to those skilled in the art, all of which are comprehended within the following claims.

I claim:

1. In combination a hub element, a shaft element, and a locking screw, said screw being provided with a threaded portion and an integral extending end portion, at least one of said portions being tapered, one of said elements having an opening in the form of a threaded aperture cooperating with said threaded portion, said other element having an opening in the form of a recess cooperating with said integral end portion, said locking screw being adapted to be driven into said threaded aperture until, while the end surface of said screw is spaced from the bottom surface of said recess, said tapered portion frictionally engages the wall of said recess and locks said screw in place with said integral end extending into said recess to prevent relative rotation between said hub and said shaft, said tapered portion of said screw being coaxial with the one of said openings in which it is positioned, at least a part of the surface of said tapered portion meeting to form an angle with a part of the surface of one of said openings which angle is not greater than about twenty degrees.

2. The combination of a shaft having an opening in the form of a cylindrical recess formed therein, a hub movably positioned on said shaft, said hub being provided with an opening in the form of a threaded aperture, and a locking screw for fixing said hub to said shaft, said locking screw having a threaded portion for cooperating with said threaded aperture and having also an integral end portion for cooperating with said recess, said integral end portion being tapered, said locking screw being adapted to be driven into said threaded aperture until said tapered portion engages the wall of said cylindrical recess and frictionally locks said screw in place with said integral end extending into said recess to prevent relative rotation between said hub and said shaft, said tapered portion of said screw being coaxial with that one of said openings in which it is positioned, a part of the surface of said tapered portion and a part of the surface of said recess meeting to form an angle which is not greater than about twenty degrees.

3. The combination of a shaft having a cylindrical recess formed therein, a hub movably positioned on said shaft, said hub being provided with a threaded cylindrical aperture, and a locking screw for fixing said hub to said shaft, said locking screw having a cylindrical threaded portion for cooperating with said threaded aperture and having also an integral end portion for cooperating with said recess, said integral end portion being tapered, said locking screw being adapted to be driven into said threaded aperture until said tapered portion engages the wall of said cylindrical recess and frictionally locks said screw in place with said integral end extending into said recess to prevent relative rotation between said hub and said shaft a part of the surface of said tapered portion and a part of the surface of said recess meeting to form an angle which is not greater than about twenty degrees.

4. In combination, a locking screw, and a first means slidably mounted upon a second means, said locking screw having a threaded portion and an extended end portion, at least one of said portions having a taper, means providing an opening in the form of a threaded aperture in one of said means and means providing an opening in the form of a recess in the other of said means, said locking screw being driven into said threaded aperture with said extended end portion within said recess and with said tapered portion having a circumferential zone in frictional contact with the surface of that one of said openings within which it is positioned a part of the surface of said tapered portion and a part of the surface of said recess meeting to form an angle which is not greater than about twenty degrees.

JAMES W. BATCHELDER.